United States Patent
Wang

(10) Patent No.: US 10,957,012 B2
(45) Date of Patent: Mar. 23, 2021

(54) SYSTEM AND METHOD FOR PROCESSING IMAGE INFORMATION

(71) Applicant: Beijing Xiaomi Mobile Software Co., Ltd., Beijing (CN)

(72) Inventor: Ke Wang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 188 days.

(21) Appl. No.: 16/019,225

(22) Filed: Jun. 26, 2018

(65) Prior Publication Data

US 2019/0026859 A1 Jan. 24, 2019

(30) Foreign Application Priority Data

Jul. 20, 2017 (CN) .......................... 201710597775.5

(51) Int. Cl.
*G06T 3/40* (2006.01)
*H04N 21/81* (2011.01)
(Continued)

(52) U.S. Cl.
CPC ................ *G06T 3/40* (2013.01); *G06F 16/58* (2019.01); *G06T 7/80* (2017.01); *G06T 7/90* (2017.01); *H04L 51/10* (2013.01); *H04N 21/440263* (2013.01); *H04N 21/632* (2013.01); *H04N 21/8153* (2013.01); *H04N 21/8586* (2013.01)

(58) Field of Classification Search
None
See application file for complete search history.

(56) References Cited

U.S. PATENT DOCUMENTS

| | | | | |
|---|---|---|---|---|
| 2002/0073205 A1* | 6/2002 | Mostafa | ................ | H04L 51/24 709/227 |
| 2008/0075395 A1* | 3/2008 | Wallace | ................ | G06F 16/172 382/306 |

(Continued)

FOREIGN PATENT DOCUMENTS

| | | |
|---|---|---|
| CN | 103179156 A | 6/2013 |
| CN | 103475929 A | 12/2013 |

(Continued)

OTHER PUBLICATIONS

Extended European Search Report dated Dec. 4, 2018 in European Patent Application No. 18184017.4, 22 pages.

(Continued)

*Primary Examiner* — Andrae S Allison
(74) *Attorney, Agent, or Firm* — Oblon, McClelland, Maier & Neustadt, L.L.P.

(57) ABSTRACT

The present disclosure is directed to two information processing methods and an information processing apparatus. An information processing method includes determining, by processing circuitry of the information processing apparatus, an original image having an original image size and a storage path of the original image. The information processing method also includes determining a sample image having a sample image size from the original image by adjusting at least one image parameter. The sample image size is smaller than the original image size. The information processing method includes sending the sample image and the storage path of the original image to a server device.

15 Claims, 9 Drawing Sheets

(51) Int. Cl.
*H04N 21/63* (2011.01)
*H04N 21/4402* (2011.01)
*H04N 21/858* (2011.01)
*G06T 7/80* (2017.01)
*G06T 7/90* (2017.01)
*G06F 16/58* (2019.01)
*H04L 12/58* (2006.01)

(56) References Cited

U.S. PATENT DOCUMENTS

| | | | | |
|---|---|---|---|---|
| 2008/0104522 | A1* | 5/2008 | Florence | G06F 16/58 715/746 |
| 2008/0205772 | A1* | 8/2008 | Blose | G06K 9/00711 382/225 |
| 2015/0350270 | A1* | 12/2015 | Caras | H04W 24/08 709/203 |
| 2016/0035074 | A1* | 2/2016 | Jeong | G06T 3/40 382/282 |
| 2016/0219007 | A1 | 7/2016 | Caras et al. | |
| 2016/0219249 | A1 | 7/2016 | Caras et al. | |
| 2016/0224193 | A1 | 8/2016 | Caras et al. | |
| 2018/0077107 | A1 | 3/2018 | Mostafa | |
| 2019/0042830 | A1* | 2/2019 | Chen | G06T 5/50 |

FOREIGN PATENT DOCUMENTS

| | | |
|---|---|---|
| CN | 104092749 A | 10/2014 |
| CN | 106294798 A | 1/2017 |
| EP | 1 643 744 A1 | 4/2006 |
| GB | 2509323 A | 7/2014 |
| WO | WO 02/11398 A1 | 2/2002 |
| WO | WO 2017/109353 A1 | 6/2017 |

OTHER PUBLICATIONS

Sidharth PK: "5 Ways to Send Pictures in WhatsApp without Losing Quality", Retrieved from the Internet: URL: https://www.techbii.com/send-full-resolution-whatsapp-image/, XP002786805, Jul. 18, 2017, 7 pages.

Gogoi, N. "How to Send Full Resolution Photos in WhatsApp", Retrieved from the Internet: URL: https://www.guidingtech.com/69774/ful-resolution-whatsapp/, XP002786806, Jul. 17, 2017, 7 pages.

Combined Chinese Office Action and Search Report dated Jul. 16, 2019, in Patent Application No. 201710597775.5, 9 pages (with English Translation of Category of Cited Documents).

* cited by examiner

```
PICTURE INFORMATION PROCESSING APPARATUS 60
    ┌─────────────────────────────────────┐
    │     DETERMINING MODULE 601          │
    └─────────────────────────────────────┘
    ┌─────────────────────────────────────┐
    │     FIRST ACQUIRING MODULE 602      │
    │  ┌───────────────────────────────┐  │
    │  │ FOURTH ACQUIRING SUB-MODULE 6024│ │
    │  └───────────────────────────────┘  │
    └─────────────────────────────────────┘
    ┌─────────────────────────────────────┐
    │     FIRST SENDING MODULE 603        │
    └─────────────────────────────────────┘
```

Fig. 6e

```
PICTURE INFORMATION PROCESSING APPARATUS 60
    ┌─────────────────────────────────────┐
    │     DETERMINING MODULE 601          │
    └─────────────────────────────────────┘
    ┌─────────────────────────────────────┐
    │     FIRST ACQUIRING MODULE 602      │
    │  ┌───────────────────────────────┐  │
    │  │ FIFTH ACQUIRING SUB-MODULE 6025│ │
    │  └───────────────────────────────┘  │
    └─────────────────────────────────────┘
    ┌─────────────────────────────────────┐
    │     FIRST SENDING MODULE 603        │
    └─────────────────────────────────────┘
```

Fig. 6f

```
PICTURE INFORMATION PROCESSING APPARATUS 70
    ┌─────────────────────────────────────┐
    │    SECOND RECEIVING MODULE 701      │
    └─────────────────────────────────────┘
    ┌─────────────────────────────────────┐
    │    SECOND SENDING MODULE 702        │
    └─────────────────────────────────────┘
    ┌─────────────────────────────────────┐
    │    THIRD RECEIVING MODULE 703       │
    └─────────────────────────────────────┘
```

Fig. 7a

SYSTEM AND METHOD FOR PROCESSING IMAGE INFORMATION

CROSS-REFERENCE TO RELATED APPLICATION

This application is based upon and claims a priority to Chinese patent application No. 201710597775.5, filed on Jul. 20, 2017, the entire contents of which are incorporated herein by reference.

TECHNICAL FIELD

The present disclosure relates to the technical field of data processing, and more particularly, to apparatuses, a server device, a system and methods for processing image information.

BACKGROUND

With the development of communication technology, mobile phones are becoming more and more widely used, thereby greatly expanding people's social-interaction ranges. Meanwhile, based on expanded social-interaction ranges, more and more users are using instant messaging software on the mobile phones to communicate. In the related art, a user may not only use the instant messaging software to send a text, but also use the instant messaging software to send a picture (or an image). Because pictures are more intuitive, more and more users prefer to chat by sending pictures.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

In order to overcome the problem existing in the related art, embodiments of the present disclosure provide picture information processing methods (or image information processing methods), apparatuses, a server device, and a system as follows.

According to an aspect of the embodiments of the present disclosure, an information processing method is provided. The information processing method includes determining, by processing circuitry of an information processing apparatus, an original image having an original image size and a storage path of the original image. The information processing method includes determining a sample image having a sample image size from the original image by adjusting at least one image parameter. The sample image size is smaller than the original image size. The information processing method further includes sending the sample image and the storage path of the original image to a server device.

In some embodiments, the at least one image parameter includes at least one of an image format, a pixel size, an image resolution, and a color space. Further, the determining the sample image includes at least one of: determining, based on a first preset rule that specifies a sample image format for image compression, the sample image by compressing the original image having an original image format into the sample image having the sample image format; determining, based on a second preset rule that specifies a sample pixel size, the sample image by compressing the original image having an original pixel size into the sample image having the sample pixel size, the original pixel size being smaller than the sample pixel size; determining, based on a third preset rule that specifies a sample image resolution, the sample image by compressing the original image having an original image resolution into the sample image having the sample image resolution, the original image resolution being higher than the sample image resolution; and determining, based on a fourth preset rule that specifies a sample color space, the sample image by compressing the original image having an original color space into the sample image having the sample color space.

In an example, the determining the sample image comprises determining the sample image by cropping the original image based on a fifth preset rule that specifies an area of the original image and a size of the area where the area corresponds to the sample image.

In some embodiments, the information processing method can further includes receiving, from the server device, another sample image corresponding to another original image. The other sample image is determined from the other original image by adjusting the at least one image parameter. A size of the other sample image is smaller than a size of the other original image. The information processing method includes determining whether an image acquisition instruction is received. The image acquisition instruction instructs acquisition of the other original image. When the image acquisition instruction is determined to be received, the information processing method includes sending an image acquisition request to the server device, and receiving the other original image from the server device. The image acquisition request is used to request the server device to send the other original image.

In some examples, the information processing method further includes receiving the image acquisition instruction via a preset button on an interface of the information processing apparatus. The interface is used to display the other sample image. The information processing method can also include detecting an operation on the other sample image by a user, and determining whether the operation on the other sample image satisfies a sixth preset rule. The sixth preset rule specifies an operation used to acquire the other original image. When the operation is determined to satisfy the sixth preset rule, the information processing method includes determining that the image acquisition instruction is received.

In an embodiment, the information processing method includes generating image information that includes the sample image and the storage path based on the sample image and the storage path, and sending the image information to the server device. The image information indicates an association relationship between the sample image and the storage path.

In an example, the storage path includes an identifier of the information processing apparatus and a storage location of the original image in the information processing apparatus.

According to an aspect of the embodiments of the present disclosure, an information processing method is provided. The information processing method includes receiving, by a server device, a sample image corresponding to an original image and a storage path of the original image from a first information processing apparatus. The sample image is determined from the original image by adjusting at least one image parameter. A size of the sample image is smaller than a size of the original image. The information processing method also includes storing, by the server device, the storage path, and sending, by interface circuitry of the server device, the sample image to a second information processing apparatus.

In some embodiments, the information processing method further includes receiving an image acquisition request from the second information processing apparatus. The image acquisition request is used to request the server device to send the original image. The information processing method further includes acquiring the original image based on the storage path, and sending the acquired original image to the second information processing apparatus.

According to an aspect of the embodiments of the present disclosure, an information processing apparatus is disclosed. The information processing apparatus includes processing circuitry and interface circuitry. The processing circuitry is configured to determine an original image having an original image size and a storage path of the original image, and determine a sample image having a sample image size from the original image by adjusting at least one image parameter. The sample image size is smaller than the original image size. The interface circuitry is configured to send the sample image and the storage path of the original image to a server device.

It should be understood that both the foregoing general description and the following detailed description are illustrative and explanatory only and are not restrictive of the present disclosure.

BRIEF DESCRIPTION OF THE DRAWINGS

Herein, the accompanying drawings, which are incorporated in and constitute a part of this specification, illustrate embodiments consistent with the disclosure and, together with the description, serve to explain the principles of the disclosure.

FIG. 6e is a schematic diagram illustrating a structure of a picture information processing apparatus according to an exemplary embodiment of the disclosure;

FIG. 6f is a schematic diagram illustrating a structure of a picture information processing apparatus according to an exemplary embodiment of the disclosure;

FIG. 7a is a schematic diagram illustrating a structure of a picture information processing apparatus according to an exemplary embodiment of the disclosure;

Figure 1:
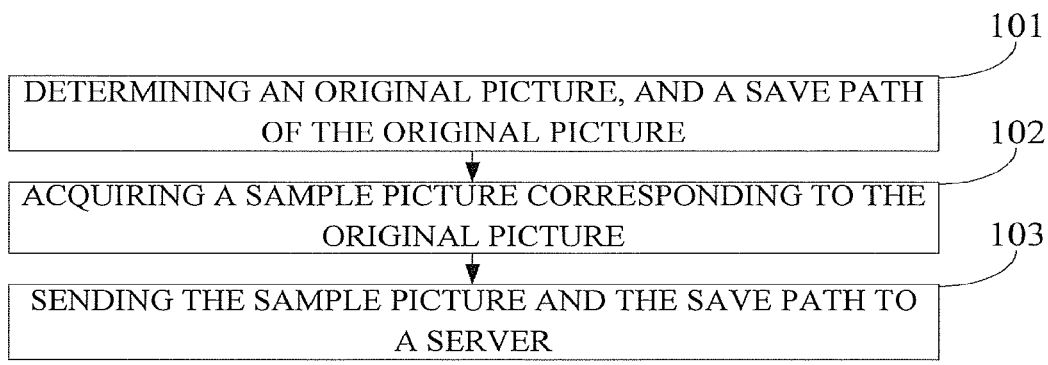
FIG. 1 is a flow chart illustrating a picture information processing method (or an image information processing method) according to an exemplary embodiment of the disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Herein, reference will now be made in detail to exemplary embodiments, examples of which are illustrated in the accompanying drawings. The following description refers to the accompanying drawings in which the same numbers in different drawings represent the same or similar elements unless otherwise indicated. The implementations set forth in the following description of exemplary embodiments do not represent all implementations consistent with the disclosure. Instead, they are merely examples of apparatuses and methods consistent with aspects related to the disclosure as recited in the appended claims.

Terms used in the application are intended not to limit the application but only to describe specific embodiments. "A", "said" and "the" used in a singular form in the application and the appended claims are also intended to include a plural form, unless other meanings are clearly represented in the context. It should also be understood that term "and/or" used in the present disclosure refers to and includes any or all possible combinations of one or more associated items which are listed.

It should be understood that, although terms first, second, third and the like may be adopted to describe various kinds of information in the application, the information should not be limited to these terms. These terms are only adopted to distinguish information of the same type. For example, without departing from the scope of the application, first information may also be called as second information, and similarly, second information may also be called as first information. It depends on the context. For example, word "if" used herein may be explained to be "while" or "when" or "in response to determination".

According to embodiments of the present disclosure, there are provided technical solutions involving a first terminal (or a first information processing apparatus), a second terminal (or a second information processing apparatus) and a server (or a server device). The first terminal and the second terminal may be mobile phones, tablet computers, personal computers or other devices capable of storing and/or displaying a picture (or an image). The server may be a server provided by an operator or may be a cloud server provided by a third-party. These are not limited in the embodiments of the present disclosure. In the related art, if the first terminal sends a high-definition picture to the second terminal, the first terminal first sends the high-definition picture to the server. The server stores the high-definition picture, and then forwards the high-definition picture to the second terminal. If there are many terminals to send high-definition pictures, the solution in the related art would cause the server to consume many storage resources because high-definition pictures have large data sizes. Meanwhile, if the second terminal is unable to display a high-definition picture or is not instructed to display a high-definition picture, the solution in the related art would further cause ineffective use of communication resources of the first terminal and the second terminal, resulting in unfavorable user experience.

In the technical solutions provided by embodiments of the present disclosure, when the first terminal sends a picture to the second terminal, the first terminal may first send the sample picture (or the sample image) and the save path of the original picture to the server. The server may send the sample picture to the second terminal, and then the server, based on a request from the second terminal, acquires from the first terminal the original picture of the sample picture and sends the original picture to the second terminal. This avoids resource consumptions due to storage by the server of original pictures. Meanwhile, this avoids ineffective downloading of high-definition pictures when the user using the second terminal does not need to view high-definition pictures, thereby improving the flexibility for the second terminal to acquire pictures.

According to embodiments of the present disclosure, there is provided a picture information processing method, which is implemented by a first terminal, a second terminal and a server. For different performers of the method, there are provided three sets of embodiments for implementing the picture information processing method respectively.

At the First Terminal

FIG. 1 is a flow chart illustrating a picture information processing method according to an exemplary embodiment. The method is applicable to the first terminal. As shown in FIG. 1, the method includes the following steps 101 to 103.

Step 101: determining an original picture (or an original image), and a save path (or a storage path) of the original picture.

As an example, a virtual button for sending a picture is displayed on the first terminal. If a user needs to send a picture to a second terminal by the first terminal, the user may click the virtual button. After detecting the click, the first terminal opens a picture album, and displays multiple pictures included in the picture album. The first terminal may instruct the user to select from the multiple pictures a picture the user needs to send, and as needed, the user may click the picture the user needs to send. When detecting the click, the first terminal may determine the picture clicked by the user as the original picture, and at the same time, the first terminal acquires a save path of the original picture. The save path includes an identification of the first terminal, and a storage address of the original picture on the first terminal.

Note that the original picture may be saved in the first terminal, and the save path is a path towards/identifying a location in the first terminal; or that the original picture may be saved in another terminal from which the first terminal acquires the original picture, and the save path is a path identifying where the original picture is saved in said another terminal. This is not limited in the present disclosure.

Step 102: acquiring a sample picture corresponding to the original picture.

The sample picture is a picture obtained from the original picture by picture parameter (or image parameter) adjustment, and the sample picture occupies a smaller memory space than the original picture. In an example, a sample image size is smaller than an original image size.

As an example, after determining the original picture, the first terminal may acquire the sample picture of the original picture by adjusting a resolution (or an image resolution) or a compression format (or an image format) of the original picture in accordance with a preset rule.

Optionally, the first terminal may acquire the sample picture by adjusting the format of the original picture in accordance with a first preset rule.

At the time of initialization, the first terminal may pre-store the first preset rule therein, which rule defines the format (or the image format) of the sample picture. Common picture formats include Bitmap (BMP), Graphics Interchange Format (GIF), Portable Network Graphics (PNG), Tagged Graphics (TGA), Tag Image File Format (TIFF) and Joint Photographic Experts Group (JPEG). Among these, formats usually used for displaying a high-definition picture include BMP, GIF, TGA and PNG, and formats usually used for displaying a normal-definition or standard-definition picture include TIFF and JPEG. A picture has a much smaller data size when displayed in the format of TIFF or JPEG than when displayed in the format of BMP, GIF, TGA or PNG. The first terminal may adjust the format of the original picture by applying a compression algorithm converting a format to another format. After determining the original picture, the first terminal may acquire a compression algorithm converting the format of the original picture to the format defined by the first preset rule, and then compress the original picture based on the compression algorithm. For example, assuming that the format of the sample picture defined by the first preset rule is JPEG and the format of the original picture is BMP, the first terminal, after determining the original picture, may acquire the sample picture in the format of JPEG by compressing the original picture based on a compression algorithm from BMP to JPEG.

Alternatively, the first terminal may acquire the sample picture by adjusting the pixel size of the original picture in accordance with a second preset rule.

At the time of initialization, the first terminal may pre-store the second preset rule therein, which rule defines the pixel size of the sample picture. Generally, the larger the pixel is, the smaller the number of pixels per unit size is and the lower definition the picture is of, and the smaller the pixel is, the larger the number of pixels per unit size is and the higher definition the picture is of. Accordingly, the first terminal may change the data size of the picture by adjusting the pixel size of the picture. Assuming that the original picture consists of 1280*960 pixels in total and has a size of 8 cm*6 cm, each of pixels has a size of 0.00625 cm*0.00625 cm. In order to reduce the data size of the original picture, the second preset rule defines the pixel size of the sample picture as 0.00625 cm*0.00625 cm, and accordingly the first terminal may translate 10*10 pixels, each having a size of 0.00625 cm*0.00625 cm, from the original picture into one pixel having a size of 0.0625 cm*0.0625 cm. Without a change in picture size, the sample picture acquired by adjusting pixel size includes 128*96 pixels. In this way, the sample picture is much smaller than the original picture in data size.

Alternatively, when acquiring the sample picture corresponding to the original picture, the first terminal may acquire the sample picture by adjusting the resolution of the original picture in accordance with a third preset rule.

At the time of initialization, the first terminal may pre-store the third preset rule therein, which rule defines the resolution (or the image resolution) of the sample picture. The picture resolution may be represented by either the number of pixels per unit size or the number of total pixels included in the picture. Generally, the higher the resolution is, the larger the data size is and the higher definition the picture is of; and the lower the resolution is, the smaller the data size is and the more blurred the picture is. Accordingly, the first terminal may acquire the sample picture of the original picture by adjusting the picture resolution. Commonly, the resolution for displaying a high-definition picture is 1600*1200 or 2048*1536, and the resolution for displaying a normal-definition or standard-definition picture is 640*480 or 1024*768. Assuming that the resolution of the original picture is 2048*1536 and the resolution of the sample picture defined by the third preset rule is 640*480, the first terminal may acquire the sample picture having a resolution of 640*480 by proportionally adjusting the number of pixels per unit size of the original picture.

Alternatively, the first terminal may acquire the sample picture by adjusting the color space of the original picture in accordance with a fourth preset rule.

At the time of initialization, the first terminal may pre-store the fourth preset rule therein, which rule defines the color space of the sample picture and also describes a translation algorithm between different color spaces. In order to improve displaying of a high-definition picture, the color space of the high-definition picture would be generally displayed in the format of Cyan Magenta Yellow Key (CMYK), resulting in large data size of the high-definition picture. Accordingly, the first terminal may adjust the color space of the original picture when acquiring the sample picture of the original picture. Assuming that the color space of the original picture is CMYK and the color space of the sample picture defined by the fourth preset rule is RGB, the first terminal, after determining the original picture, may acquire the sample picture whose color space is RGB by translating the original picture whose color space is CMYK based on a preset algorithm described by the fourth preset rule.

The first terminal may acquire the sample picture by adjusting the format, pixel, resolution or color space of the original picture, thereby improving the diversity and the selectivity of the sample picture.

As an example, the first terminal may also acquire the sample picture by cropping the original picture in accordance with a fifth preset rule.

At the time of initialization, the first terminal may pre-store the fifth preset rule therein, which rule defines a region (or an area) to be cut out from the sample picture and a size of the region. Assuming that the size of the original picture is 2048*1536 and the region to be cut out from the sample picture defined by the fifth preset rule is the central region of the original picture and has a size of 640*480, the first terminal, after determining the original picture, may cut out a part of the original picture as the sample picture, the cut out part being centered at the center of the original picture and having a size of 640*480. In this way, the first terminal quickly acquires the sample picture of the original picture by cropping the original picture, such that not only is the information, the user considers important, of the original picture is retained but also the space occupied by the picture is reduced, thereby improving the picture transmission efficiency of the first terminal.

Step 103: sending the sample picture and the save path to a server.

As an example, the first terminal may, based on the sample picture and the save path, generate picture information (or image information) including the sample picture and the save path and indicating that the sample picture and the save path are associated with each other, and then send the picture information to the server.

In the technical solution provided by the embodiment of the present disclosure, when the first terminal sends a picture to the second terminal, the first terminal may first send the sample picture and the save path of the original picture to the server, so that the server sends the sample picture to the second terminal; and then the server, based on the request from the second terminal, acquires from the first terminal the original picture of the sample picture and sends the original picture to the second terminal, thereby avoiding resource consumptions due to storage by the server of original pictures, and meanwhile improving the flexibility for the second terminal to acquire a picture.

At the Server (or the Server Device)

Figure 2A:
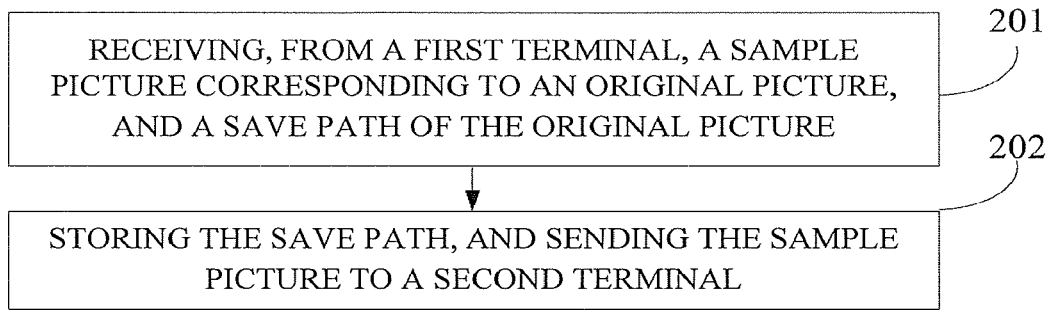
FIG. 2a is a flow chart illustrating a picture information processing method according to an exemplary embodiment of the disclosure.

FIG. 2a is a flow chart illustrating a picture information processing method according to an exemplary embodiment. The method is applicable to the server. As shown in FIG. 2a, the method includes the following steps 201 to 202.

Step 201: receiving, from a first terminal, a sample picture corresponding to an original picture, and a save path of the original picture.

The sample picture is a picture obtained from the original picture by picture parameter adjustment, and the sample picture occupies a smaller memory space than the original picture.

As an example, after acquiring the sample picture and the save path of the original picture, the first terminal may send the sample picture and the save path to the server via a mobile data network or the Internet. After receiving the sample picture and the save path, the server establishes an association relationship between the sample picture and the save path. Alternatively, the server receives, from the first terminal, picture information including the sample picture and the save path and indicating that the sample picture and the save path are associated with each other.

The first terminal may also send the sample picture and the save path to another terminal, and then said another terminal forward them to the server. This is not limited in the embodiments of the present disclosure.

In practical application, the first terminal may also first send the original picture to the server. The server stores the original picture, generates the sample picture of the original picture, and then sends the sample picture to a second terminal. The second terminal displays the sample picture, and prompts the user to view it. If needing to view the original picture of the sample picture, the user may click the sample picture. After detecting the click, the second terminal downloads the original picture from the server, and displays the original picture.

Step 202: storing the save path, and sending the sample picture to a second terminal.

As an example, the server may store the save path in an arbitrary position. Optionally, the server is configured with a picture path association table, which table records sample pictures and associated save paths sent from different terminals. After receiving the sample picture and the save path from the first terminal, the server may, in accordance with an association relationship between the sample picture and the save path, store the sample picture and the save path in the picture path association table, and send the sample picture to the second terminal.

In practical application, the server may also store the picture path association table in another device connected thereto. For example, the server may store the picture path association table in a third terminal connected thereto, such as a mobile phone, a tablet computer or a personal computer. When needing to query the picture path association table, the server may first send an association table acquisition request to the third terminal, and then receive the picture path association table which is sent from the third terminal in response to the association table acquisition request.

In the technical solution provided by the embodiment of the present disclosure, after receiving, from the first terminal, the sample picture and the save path of the original picture, the server may store the save path and send the sample picture to the second terminal, thereby releasing the server from storing original pictures with larger data size, and thus saving resources of the server.

Figure 2B:
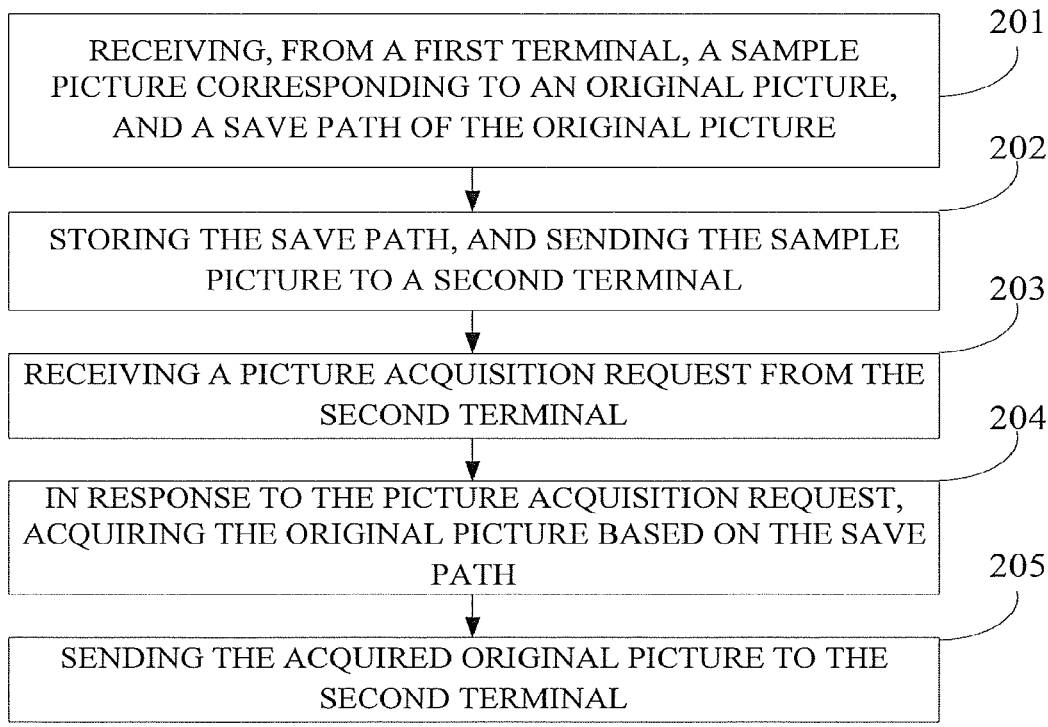
FIG. 2b is a flow chart illustrating a picture information processing method according to an exemplary embodiment of the disclosure.

In one embodiment, as shown in FIG. 2b, the method further includes steps 203 to 205.

Step 203: receiving a picture acquisition request from the second terminal.

The picture acquisition request requests acquiring of the original picture.

As an example, after receiving the sample picture acquired by the server, the second terminal may display it on a screen, and prompt the user to view it by ringing, vibrating or the like. If the user considers that the sample picture' details are blurred when viewing the sample picture and the user further needs to view the original picture of the sample picture, the user may click the sample picture. After detecting the user click, the second terminal determines that a picture acquisition instruction from the user is acquired. In response to the picture acquisition instruction, the second terminal may send to the server a picture acquisition request including an identification of the sample picture.

Step 204: in response to the picture acquisition request, acquiring the original picture based on the save path.

As an example, after acquiring the picture acquisition request from the second terminal, the server analyses the picture acquisition request, acquires the identification of the sample picture included in the picture acquisition request, and then queries the picture path association table based on the identification of the sample picture so as to acquire the save path associated with the sample picture indicated by the identification of the sample picture. After acquiring the save path, the server may first, based on a terminal identification (or a terminal identifier) included in the save path, determine that the original picture is stored in the first terminal, and then the server may acquire the original picture from the first terminal based on a storage address (or a storage location) included in the save path.

Step 205: sending the acquired original picture to the second terminal.

As an example, the server may send the original picture to the second terminal via a mobile data network or the Internet.

In the technical solution provided by the embodiment of the present disclosure, the server may, based on the request from the second terminal and the stored save path of the original picture, acquire the original picture from the first terminal and send the original picture to the second terminal, thereby avoiding resource consumptions due to storage by the server of original pictures, and meanwhile improving the flexibility for the second terminal to acquire a picture.

At the Second Terminal

Figure 3:
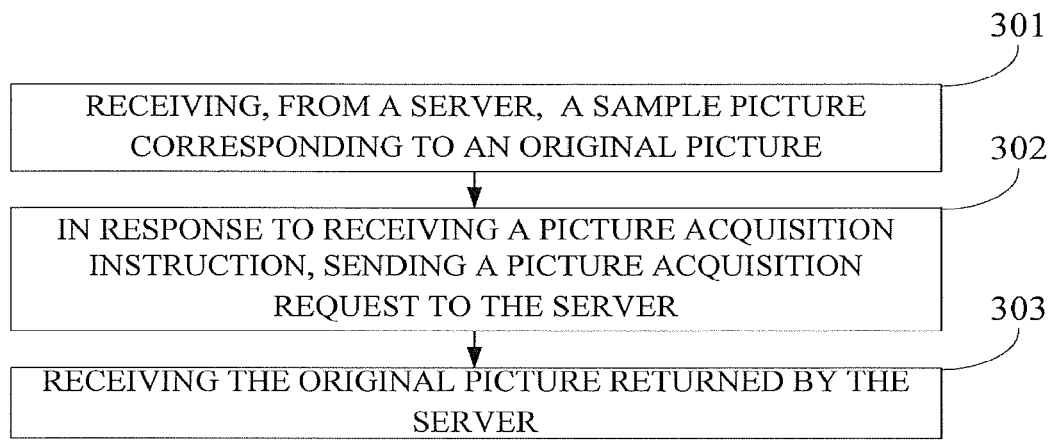
FIG. 3 is a flow chart illustrating a picture information processing method according to an exemplary embodiment of the disclosure.

FIG. 3 is a flow chart illustrating a picture information processing method according to an exemplary embodiment. The method is applicable to the second terminal. As shown in FIG. 3, the method includes the following steps 301 to 303.

Step 301: receiving, from a server, a sample picture corresponding to an original picture.

The sample picture is a picture obtained from the original picture by picture parameter adjustment, and the sample picture occupies a smaller memory space than the original picture.

After receiving, from the first terminal, the sample picture and the save path of the original picture, the server may store the save path, and send the sample picture of the original picture to the second terminal. At this time, the sample picture received by the second terminal is the sample picture corresponding to the original picture.

Step 302: in response to receiving a picture acquisition instruction (or an image acquisition instruction), sending a picture acquisition request (or an image acquisition request) to the server.

The picture acquisition instruction instructs acquiring of the original picture, and the picture acquisition request requests the server to return the original picture.

As an example, after receiving the sample picture acquired by the server, the second terminal may display it on a screen, and prompt the user to view it by ringing, vibrating or the like. Meanwhile, the second terminal may also display, on an interface on which the sample picture is displayed, a preset button which may display a text of "acquire the original picture" thereon. If the user considers that the sample picture' details are blurred when viewing the sample picture and the user further needs to view the original picture of the sample picture, the user may click the preset button. After detecting the user click, the second terminal determines that a picture acquisition instruction from the user is acquired. In response to the picture acquisition instruction, the second terminal may send to the server a picture acquisition request including an identification of the sample picture.

Alternatively, the preset button may be a physical button on the second terminal. A user may operate the physical button by means of pressing, rotation or the like. When needing to view the original picture of the sample picture, the user may press or rotate the preset button. When detecting the pressing or rotation, the second terminal determines that the picture acquisition instruction from the user is acquired.

Alternatively, at the time of initialization, the second terminal may also set a sixth preset rule therein, which rule specifies an operation rule (or an operation) to be satisfied when the user needs to view the original picture of the sample picture. For example, the operation rule is the number of clicks on the sample picture. When the second terminal receives an operation meeting the sixth preset rule on the sample picture, the second terminal determines that the picture acquisition instruction is received.

Assuming that the sixth preset rule defines a preset number. If the user considers that the sample picture' details are blurred when viewing the sample picture and the user further needs to view the original picture of the sample picture, the user may click the sample picture the preset number of times. When detecting user clicks, the second terminal records the number of user clicks. If the number of clicks is equal to the preset number, the second terminal determines that the picture acquisition instruction from the user is acquired. This embodiment indeed takes into account the fact that, when a user focuses on a picture but cannot view the picture clearly or fully, the user tends to click the picture multiple times. Thus, based on such an underlying regularity (user habit) followed when a user views a picture, determination is made as to whether to acquire the original picture. The solution better meets real needs of most users and brings to them better use experience.

The second terminal may, by the preset button on the interface or by the preset operation on the sample picture, determine whether the picture acquisition instruction is received, thus improving the convenience and the accuracy for acquiring the instruction.

Step 303: receiving the original picture returned by the server.

As an example, the server may acquire the save path of the original picture of the sample picture based on the picture acquisition request from the second terminal. Then, the server may acquire the original picture based on the save path, and send the original picture to the second terminal. After receiving the original picture, the second terminal may display it on a screen, and prompt the user to view it by ringing, vibrating or the like.

In the technical solution provided by the embodiment of the present disclosure, the second terminal may display the sample picture sent from the server, and retrieve the original picture from the server based on a user instruction, such that the second terminal is enabled to acquire pictures based on user requirements, thereby improving the flexibility for the second terminal to acquire pictures.

Hereinafter, some embodiments will be described in detail for explaining implementations.

Figure 4:
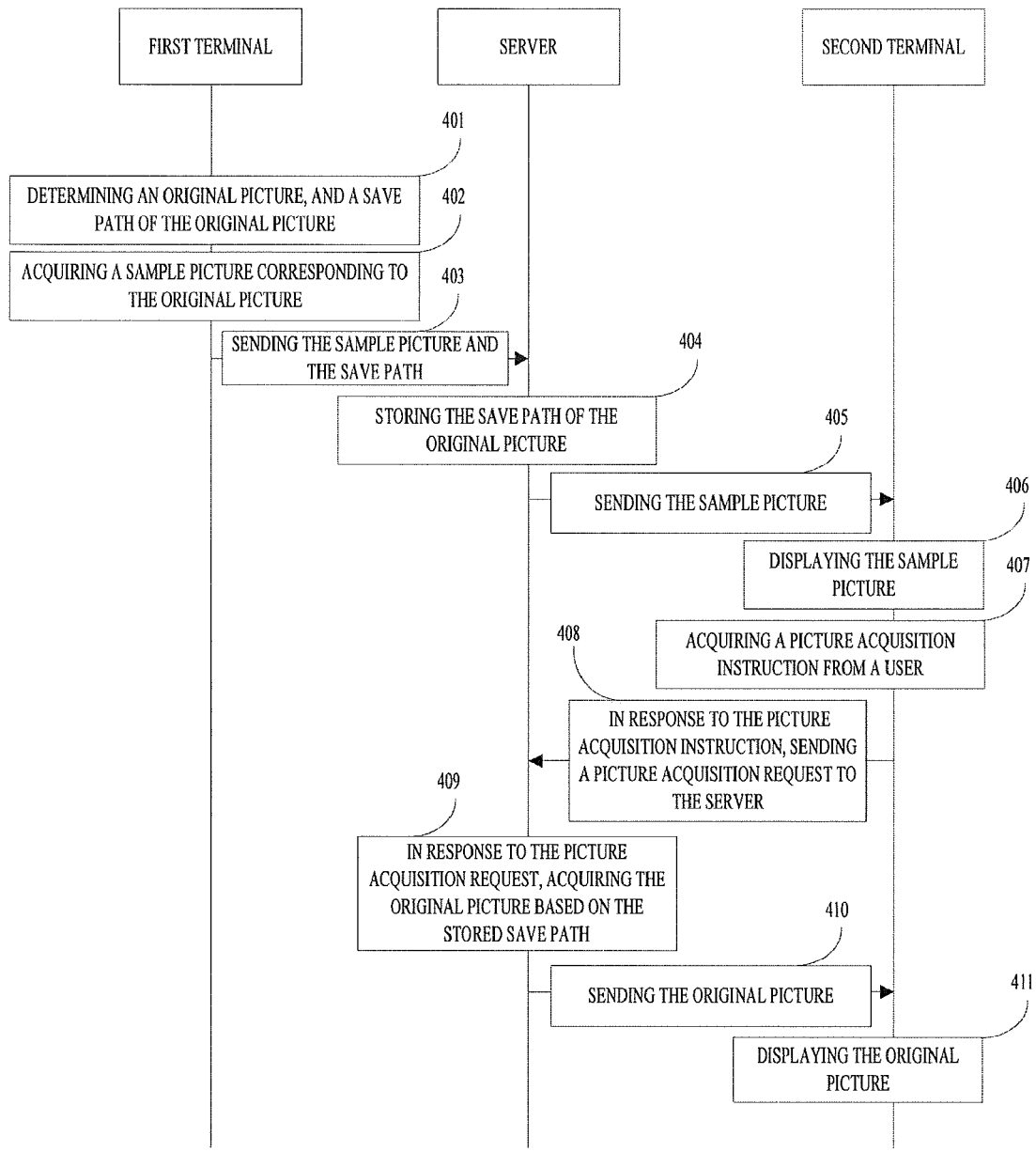
FIG. 4 is an interaction diagram illustrating a picture information processing method according to an exemplary embodiment of the disclosure.

FIG. 4 is flow chart illustrating a picture information processing method according to an exemplary embodiment. The method is applicable to a system including a first terminal, a second terminal and a server. As shown in FIG. 4, the method includes the following steps 401 to 411.

Step 401: determining, by the first terminal, an original picture, and a save path of the original picture.

Step 402: acquiring, by the first terminal, a sample picture corresponding to the original picture.

As an example, the first terminal may acquire the sample picture corresponding to the original picture by adjusting the format, pixel size, resolution, color space or the like of the original picture.

In practical application, the first terminal may also acquire the sample picture corresponding to the original picture by cutting out a preset region from the original picture.

Step 403: sending, by the first terminal, the sample picture and the save path to the server.

Step 404: storing, by the server, the save path of the original picture.

Step 405: sending, by the server, the sample picture to the second terminal.

Step 406: displaying, by the second terminal, the sample picture.

Step 407: acquiring, by the second terminal, a picture acquisition instruction from a user.

As an example, the second terminal may, by detecting the number of user clicks on the sample picture or a user operation on the preset button, determine whether the picture acquisition instruction from the user is acquired.

Step 408: in response to the picture acquisition instruction, sending, by the second terminal, a picture acquisition request to the server.

The picture acquisition instruction instructs acquiring of the original picture, and the picture acquisition request requests the server to return the original picture.

Step 409: in response to the picture acquisition request, acquiring, by the server, the original picture based on the stored save path.

Step 410: sending, by the server, the acquired original picture to the second terminal.

Step 411: displaying, by the second terminal, the original picture.

In the picture information processing method provided by the embodiment of the present disclosure, when the first terminal sends a picture to the second terminal, the first terminal may first send the sample picture and the save path of the original picture to the server, so that the server sends the sample picture to the second terminal; and then the server, based on the request from the second terminal, acquires from the first terminal the original picture of the sample picture and sends the original picture to the second terminal, thereby avoiding resource consumptions due to storage by the server of original pictures and meanwhile avoiding ineffective downloading of high-definition pictures when the user using the second terminal does not need to view high-definition pictures, and improving the flexibility for the second terminal to acquire pictures.

Hereinafter, apparatus embodiments of the present disclosure will be described which may implement method embodiments of the present disclosure.

Figure 5A:
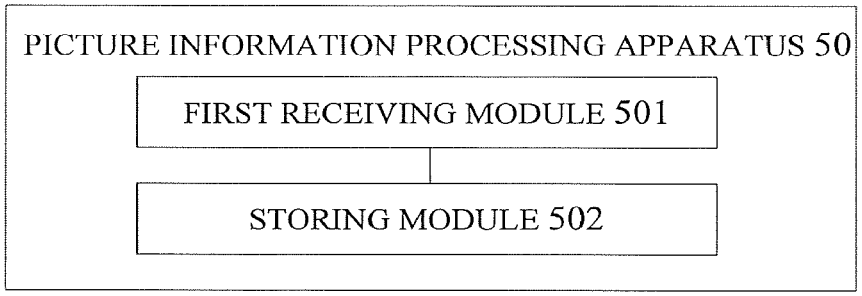
FIG. 5a is a schematic diagram illustrating a structure of a picture information processing apparatus according to an exemplary embodiment of the disclosure.

FIG. 5a is a schematic diagram illustrating a structure of a picture information processing apparatus 50 according to an exemplary embodiment. The apparatus 50 may be implemented as part or all of an electronic device by software, hardware or a combination thereof. As shown in FIG. 5a, the picture information processing apparatus 50 includes a first receiving module 501 and a storing module 502.

The first receiving module 501 is configured to receive, from a first terminal, a sample picture corresponding to an original picture, and a save path of the original picture. The sample picture is a picture obtained from the original picture by picture parameter adjustment, and the sample picture occupies a smaller memory space than the original picture.

The storing module 502 is configured to store the save path, and send the sample picture to a second terminal.

Figure 5B:
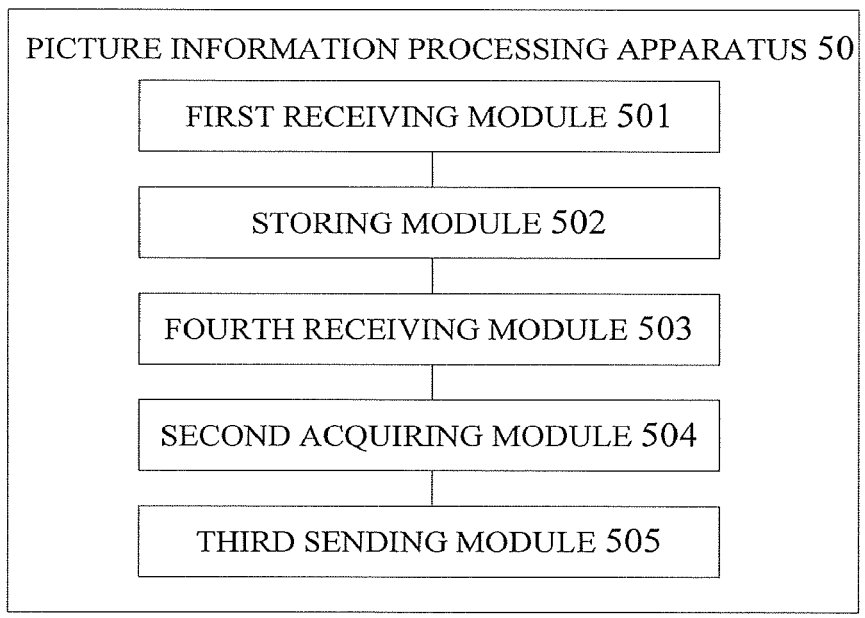
FIG. 5b is a schematic diagram illustrating a structure of a picture information processing apparatus according to an exemplary embodiment of the disclosure.

In one embodiment, as shown in FIG. 5b, the apparatus 50 further includes a fourth receiving module 503, a second acquiring module 504 and a third sending module 505.

The fourth receiving module 503 is configured to receive a picture acquisition request from the second terminal. The picture acquisition request requests acquiring of the original picture.

The second acquiring module 504 is configured to, in response to the picture acquisition request, acquire the original picture based on the save path.

The third sending module 505 is configured to send the acquired original picture to the second terminal.

The picture information processing apparatus provided by the embodiment of the present disclosure, after receiving from the first terminal the sample picture and the save path of the original picture, may store the save path and send the sample picture to the second terminal, thereby avoiding storage of original pictures with large data size, and thus saving storage resources.

Figure 6A:
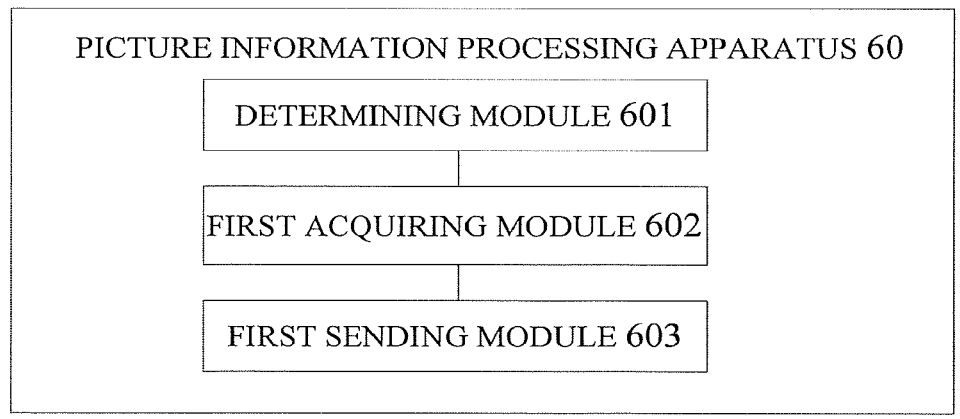
FIG. 6a is a schematic diagram illustrating a structure of a picture information processing apparatus according to an exemplary embodiment of the disclosure.
Figure 6B:
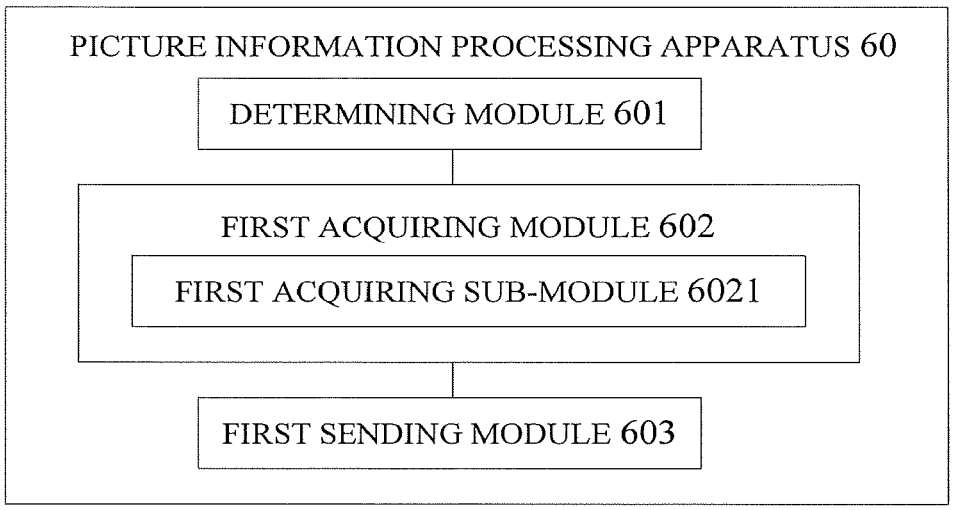
FIG. 6b is a schematic diagram illustrating a structure of a picture information processing apparatus according to an exemplary embodiment of the disclosure.
Figure 6C:
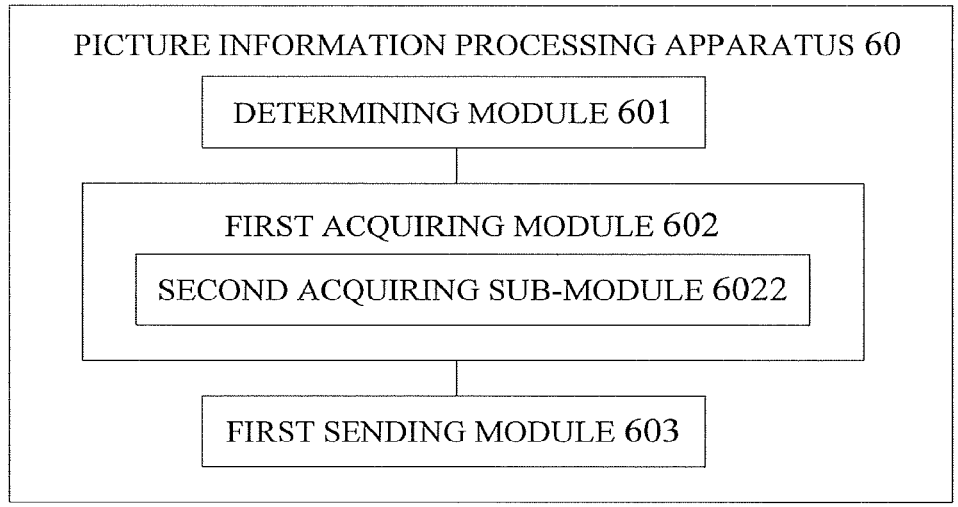
FIG. 6c is a schematic diagram illustrating a structure of a picture information processing apparatus according to an exemplary embodiment of the disclosure.
Figure 6D:
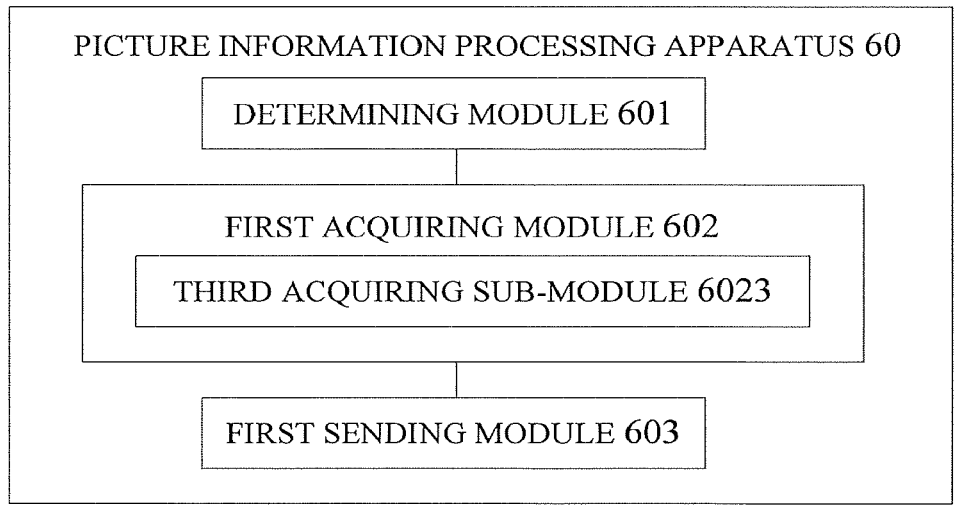
FIG. 6d is a schematic diagram illustrating a structure of a picture information processing apparatus according to an exemplary embodiment of the disclosure.

FIG. 6a is a schematic diagram illustrating a structure of a picture information processing apparatus 60 according to an exemplary embodiment. The apparatus 60 may be implemented as part or all of an electronic device by software, hardware or a combination thereof. As shown in FIG. 6a, the picture information processing apparatus 60 includes a determining module 601, a first acquiring module 602 and a first sending module 603.

The determining module 601 is configured to determine an original picture, and a save path of the original picture.

The first acquiring module 602 is configured to acquire a sample picture corresponding to the original picture. The sample picture is a picture obtained from the original picture by picture parameter adjustment, and the sample picture occupies a smaller memory space than the original picture.

The first sending module 603 is configured to send the sample picture and the save path to a server.

In one embodiment, as shown in 6b, the first acquiring module 602 includes a first acquiring sub-module 6021 configured to obtain the sample picture by adjusting a format of the original picture in accordance with a first preset rule.

In one embodiment, as shown in 6c, the first acquiring module 602 includes a second acquiring sub-module 6022 configured to obtain the sample picture by adjusting a pixel size of the original picture in accordance with a second preset rule.

In one embodiment, as shown in 6d, the first acquiring module 602 includes a third acquiring sub-module 6023 configured to obtain the sample picture by adjusting a resolution of the original picture in accordance with a third preset rule.

In one embodiment, as shown in 6e, the first acquiring module 602 includes a fourth acquiring sub-module 6024 configured to obtain the sample picture by adjusting a color space of the original picture in accordance with a fourth preset rule.

In one embodiment, as shown in 6f, the first acquiring module 602 includes a fifth acquiring sub-module 6025 configured to obtain the sample picture by cropping the original picture in accordance with a fifth preset rule.

The picture information processing apparatus provided by the embodiment of the present disclosure, when sending a picture to the second terminal, may first send the sample picture and the save path of the original picture to the server, so that the server sends the sample picture to the second terminal; and then the server, based on the request from the second terminal, acquires from the apparatus the original picture of the sample picture and sends the original picture to the second terminal, thereby avoiding resource consumptions due to storage by the server of original pictures and meanwhile improving the flexibility for the second terminal to acquire a picture.

FIG. 7a is a schematic diagram illustrating a structure of a picture information processing apparatus 70 according to an exemplary embodiment. The apparatus 70 may be implemented as part or all of an electronic device by software, hardware or a combination thereof. As shown in FIG. 7a, the picture information processing apparatus 70 includes a second receiving module 701, a second sending module 702 and a third receiving module 703.

The second receiving module 701 is configured to receive, from a server, a sample picture corresponding to an original picture. The sample picture is a picture obtained from the original picture by picture parameter adjustment, and the sample picture occupies a smaller memory space than the original picture.

The second sending module 702 is configured to, in response to receiving a picture acquisition instruction, send a picture acquisition request to the server. The picture acquisition instruction instructs acquiring of the original picture, and the picture acquisition request requests the server to return the original picture.

The third receiving module 703 is configured to receive the original picture returned by the server.

Figure 7B:
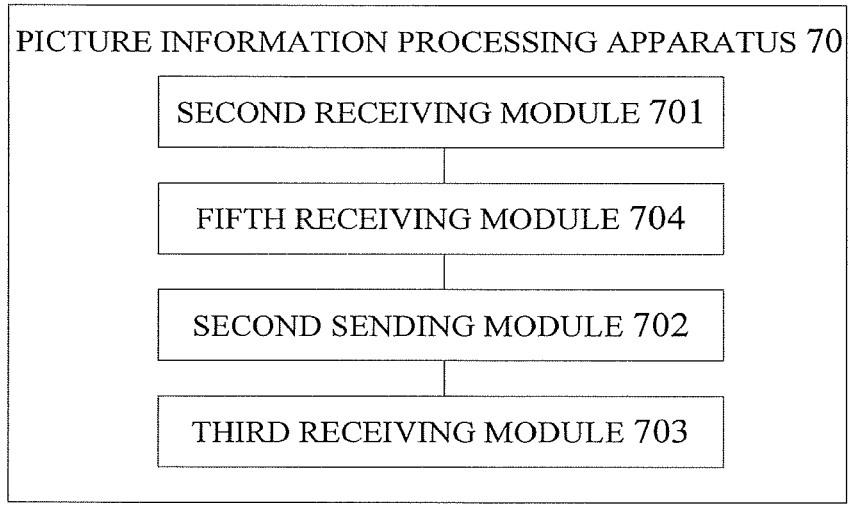
FIG. 7b is a schematic diagram illustrating a structure of a picture information processing apparatus according to an exemplary embodiment of the disclosure.

In one embodiment, as shown in FIG. 7b, the apparatus 70 may include a fifth receiving module 704 configured to receive the picture acquisition instruction by a preset button on an interface.

Figure 7C:
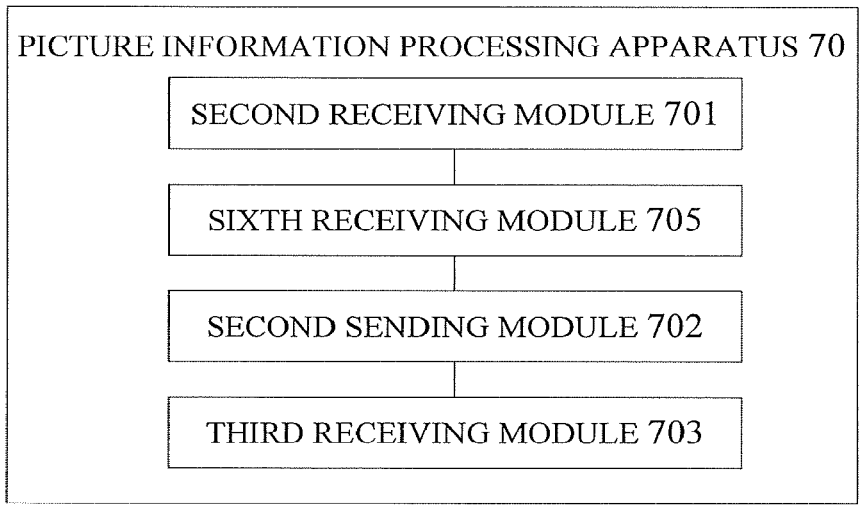
FIG. 7c is a schematic diagram illustrating a structure of a picture information processing apparatus according to an exemplary embodiment of the disclosure.

Alternatively, as shown in FIG. 7c, the apparatus 70 may include a sixth receiving module 705 configured to detect whether the sample picture receives an operation meeting a sixth preset rule, and if the operation meeting the sixth preset rule is received by the sample picture, determine that the picture acquisition instruction is received.

The picture information processing apparatus provided by the embodiment of the present disclosure may display the sample picture sent from the server, and send a picture acquisition request to the server based on a user instruction, such that the server, based on the picture acquisition request, acquires from the first terminal the original picture of the sample picture and sends the original picture to the apparatus. In this way, the apparatus is enabled to acquire different types of pictures based on user requirements, thereby improving the flexibility for the apparatus to acquire pictures.

According to the embodiment of the present disclosure, there is provided a picture information processing apparatus. The apparatus includes: a first processor; and a first memory for storing instructions executable by the first processor. The processor is configured to: receive, from a first terminal, a sample picture corresponding to an original picture, and a save path of the original picture, wherein the sample picture is a picture obtained from the original picture by picture parameter adjustment, and the sample picture occupies a smaller memory space than the original picture; and store the save path, and send the sample picture to a second terminal.

In one embodiment, the above first processor is further configured to: receive from the second terminal a picture acquisition request which requests acquiring of the original picture; in response to the picture acquisition request, acquire the original picture based on the save path; and send the acquired original picture to the second terminal.

The picture information processing apparatus provided by the embodiment of the present disclosure, after receiving from the first terminal the sample picture and the save path of the original picture, may store the save path and send the sample picture to the second terminal, thereby avoiding storage of original pictures with large data size, and thus saving storage resources.

According to the embodiment of the present disclosure, there is provided a picture information processing apparatus. The apparatus includes: a second processor; and a second memory for storing instructions executable by the second processor. The second processor is configured to: determine an original picture, and a save path of the original picture; acquire a sample picture corresponding to the original picture, wherein the sample picture is a picture obtained from the original picture by picture parameter adjustment, and the sample picture occupies a smaller memory space than the original picture; and send the sample picture and the save path to a server.

In one embodiment, the above second processor is further configured to: obtain the sample picture by adjusting a format of the original picture in accordance with a first preset rule; obtain the sample picture by adjusting a pixel size of the original picture in accordance with a second preset rule; obtain the sample picture by adjusting a resolution of the original picture in accordance with a third preset rule; or obtain the sample picture by adjusting a color space of the original picture in accordance with a fourth preset rule.

In one embodiment, the above second processor is further configured to: obtain the sample picture by cropping the original picture in accordance with a fifth preset rule.

The picture information processing apparatus provided by the embodiment of the present disclosure, when sending a picture to the second terminal, may first send the sample picture and the save path of the original picture to the server, so that the server sends the sample picture to the second terminal; and then the server, based on the request from the second terminal, acquires from the apparatus the original picture of the sample picture and sends the original picture to the second terminal, thereby avoiding resource consumptions due to storage by the server of original pictures, and meanwhile improving the flexibility for the second terminal to acquire a picture.

According to the embodiment of the present disclosure, there is provided a picture information processing apparatus. The apparatus includes: a third processor; and a third memory for storing instructions executable by the third processor. The third processor is configured to: receive, from a server, a sample picture corresponding to an original picture, wherein the sample picture is a picture obtained from the original picture by picture parameter adjustment, and the sample picture occupies a smaller memory space than the original picture; in response to receiving a picture acquisition instruction, send a picture acquisition request to the server, wherein the picture acquisition instruction instructs acquiring of the original picture, and the picture acquisition request requests the server to return the original picture; and receive the original picture returned by the server.

In one embodiment, the above third processor is further configured to: receive the picture acquisition instruction by a preset button on an interface; or detect whether the sample picture receives an operation meeting a sixth preset rule, and if the operation meeting the sixth preset rule is received by the sample picture, determine that the picture acquisition instruction is received.

The picture information processing apparatus provided by the embodiment of the present disclosure may display the sample picture sent from the server, and send a picture acquisition request to the server based on a user instruction, such that the server, based on the picture acquisition request, acquires from the first terminal the original picture of the sample picture and sends the original picture to the apparatus. In this way, the apparatus is enabled to acquire different types of pictures based on user requirements, thereby improving the flexibility for the apparatus to acquire pictures.

For the above apparatus embodiments, ways by which each module thereof performs an operation have been described in detail in the related method embodiments, and will not be elaborated herein.

Figure 8:
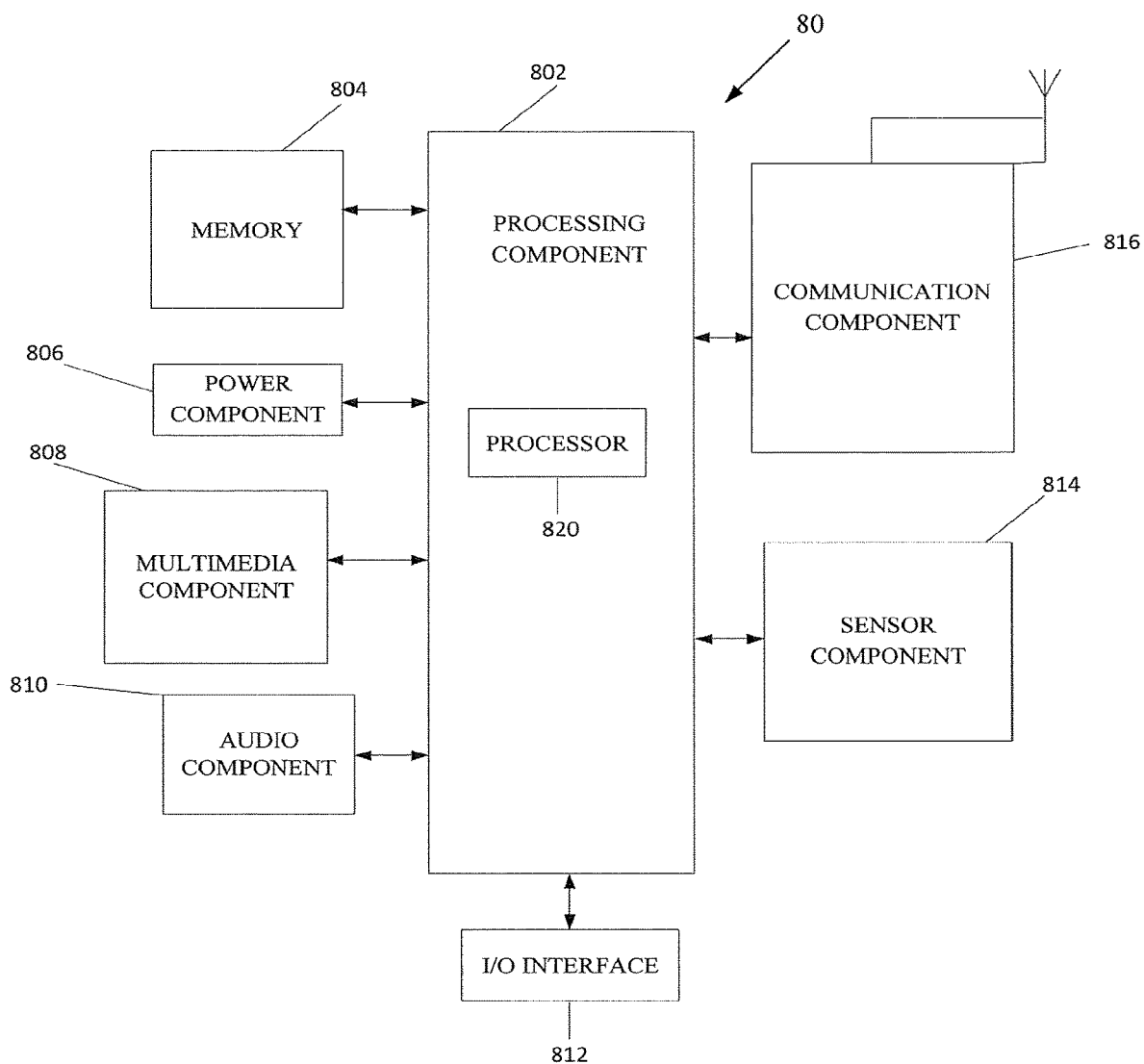
FIG. 8 is a block diagram illustrating a picture information processing apparatus according to an exemplary embodiment of the disclosure.

FIG. 8 is a block diagram illustrating a picture information processing apparatus 80 applicable to terminal devices according to an exemplary embodiment. For example, the apparatus 80 may be a mobile phone, a computer, a digital broadcast terminal, a message transceiver, a game console, a tablet device, medical equipment, exercise equipment, a personal digital assistant, or the like.

The apparatus 80 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the apparatus 80, such as the operations associated with display, phone calls, data communications, camera operations and recording operations. The processing component 802 may include one or more processors 820 to execute instructions. Moreover, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of data to support operations of the apparatus 80. Examples of such data include instructions for any applications or methods operated on the apparatus 80, contact data, phonebook data, messages, pictures, video, etc. The memory 804 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the apparatus 80. The power component 806 may include a power supply management system, one or more power sources, and any other components associated with the generation, management, and distribution of power in the apparatus 80.

The multimedia component 808 includes a screen providing an output interface between the apparatus 80 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and/or the rear camera may receive an external multimedia datum while the apparatus 80 is in an operation mode, such as a photographing mode or a video mode. Each of the front camera and the rear camera may be a fixed optical lens system or may have focus and optical zoom capability.

The audio component 810 is configured to output and/or input audio signals. For example, the audio component 810 includes a microphone (MIC) configured to receive an external audio signal when the apparatus 80 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the apparatus 80. For instance, the sensor component 814 may detect an open/closed status of the apparatus 80, relative positioning of components, e.g., the display and the keypad, of the apparatus 80, a change in position of the apparatus 80 or a component of the apparatus 80, a presence or absence of user's contact with the apparatus 80, an orientation or an acceleration/deceleration of the apparatus 80, and a change in temperature of the apparatus 80. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor or a temperature sensor.

The communication component 816 is configured to facilitate communication, wired or wirelessly, between the apparatus 80 and other devices. The apparatus 80 can access a wireless network based on a communication standard, such as WiFi, 2G or 3G or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 80 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing any of the picture information processing methods at the above first terminal or second terminal.

In exemplary embodiments, there is also provided a non-transitory computer readable storage medium including instructions, such as included in the memory 804, executable by the processor 820 in the apparatus 80, for performing the picture information processing methods at the above first terminal or second terminal. For example, the non-transitory computer-readable storage medium may be a ROM, a RAM, a CD-ROM, a magnetic tape, a floppy disc, an optical data storage device, and the like.

Figure 9:
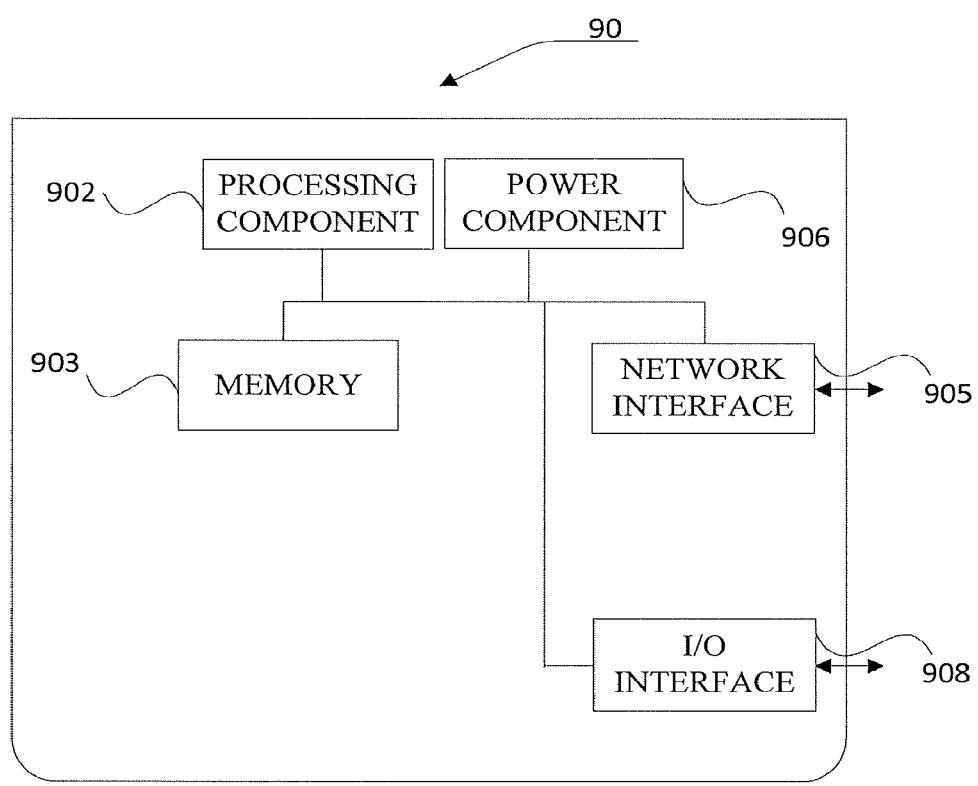
FIG. 9 is a block diagram illustrating a picture information processing apparatus according to an exemplary embodiment of the disclosure.

FIG. 9 is a block diagram illustrating a picture information processing apparatus 90 according to an exemplary embodiment. For example, the apparatus 90 may be provided as a server. The apparatus 90 includes a processing component 902, and a memory resource represented by a memory 903. The processing component 902 further includes one or more processors, and the memory resource is configured to store instructions, such as application programs, executable by the processing component 902. Application programs stored in the memory 903 may include one or more modules each corresponding to a set of instructions. In addition, the processing component 902 is configured to execute instructions, so as to perform the picture information processing method at the server.

The apparatus 90 may also include: a power component 906 configured to perform a power supply management of the apparatus 90; a wired or wireless network interface 905 configured to connect the apparatus 90 to network; and an input/output (I/O) interface 908. The apparatus 90 may operate based on an operating system stored in the memory 903, such as Windows Server™, Mac OS X™, Unix™, Linux™, FreeBSD™, or the like.

According to the embodiment of the present disclosure, there is provided a non-transitory computer readable storage medium. When executed by the processor of the apparatus 90, instructions stored on the storage medium cause the apparatus to perform any of the picture information processing method and its optional implementations at the above server.

According to the embodiment of the present disclosure, there is provided a picture information processing system including any of the above information processing apparatuses as shown in FIGS. 5a to 5b, the above information processing apparatuses as shown in FIGS. 6a to 6f and the above information processing apparatuses as shown in FIGS. 7a to 7c.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other implementations of the disclosure will be apparent to those skilled in the art from consideration of the specification and practice of the disclosure disclosed here. The present application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. An information processing method, comprising:
   determining, by processing circuitry of a first terminal device, an original image having an original image size and a storage path of the original image;
   determining, by the processing circuitry of the first terminal device, a sample image having a sample image size from the original image by adjusting at least one image parameter, the sample image size being smaller than the original image size;

sending, by interface circuitry of the first terminal device, the sample image and the storage path of the original image to a server device;

storing, by the server device, the storage path of the original image;

sending, by the server device, the sample image to a second terminal device;

displaying, by the second terminal device, the sample image on an interface;

determining, by the second terminal device, whether an image acquisition instruction is acquired from a user based on a number of clicks on the sample image by the user;

in response to the image acquisition instruction being acquired, sending, by the second terminal device to the server device, an image acquisition request for the original image;

in response to the image acquisition request, acquiring, by the server device, the original image based on the storage path of the original image;

sending, by the server device, the original image to the second terminal device; and displaying, by the second terminal device, the original image.

2. The information processing method according to claim 1, wherein the at least one image parameter includes at least one of: an image format, a pixel size, an image resolution, and a color space; and the determining the sample image includes at least one of:

determining, based on a first preset rule that specifies a sample image format for image compression, the sample image by compressing the original image having an original image format into the sample image having the sample image format;

determining, based on a second preset rule that specifies a sample pixel size, the sample image by compressing the original image having an original pixel size into the sample image having the sample pixel size, the original pixel size being smaller than the sample pixel size;

determining, based on a third preset rule that specifies a sample image resolution, the sample image by compressing the original image having an original image resolution into the sample image having the sample image resolution, the original image resolution being higher than the sample image resolution; and determining, based on a fourth preset rule that specifies a sample color space, the sample image by compressing the original image having an original color space into the sample image having the sample color space.

3. The information processing method according to claim 1, wherein the determining the sample image comprises:

determining the sample image by cropping the original image based on a fifth preset rule that specifies an area of the original image and a size of the area, the area corresponding to the sample image.

4. The information processing method according to claim 1, wherein determining whether the image acquisition instruction is acquired further comprises:

detecting the number of clicks on the sample image by the user; and determining that the image acquisition instruction is acquired by the user in response to the number of clicks being equal to a preset number.

5. The information processing method according to claim 1, wherein the sending the sample image and the storage path of the original image to the server device comprises:

generating image information that includes the sample image and the storage path based on the sample image and the storage path, the image information indicating an association relationship between the sample image and the storage path; and sending the image information to the server device.

6. The information processing method according to claim 1, wherein the storage path includes an identifier of the first terminal device and a storage location of the original image in the first terminal device.

7. The information processing method according to claim 1, further comprising:

receiving, by the server device, the sample image and the storage path of the original image from the first terminal device.

8. The information processing method according to claim 1, further comprising:

receiving the image acquisition request from the second terminal device.

9. The information processing method according to claim 1, further comprising: storing the sample image and the storage path in a table based on an association relationship between the sample image and the storage path.

10. An information processing system, comprising:

a first terminal device configured to:

determine an original image having an original image size and a storage path of the original image; and determine a sample image having a sample image size from the original image by adjusting at least one image parameter, the sample image size being smaller than the original image size; and send the sample image and the storage path of the original image to a server device;

the server device configured to:

store the storage path of the original image;

send the sample image to a second terminal device;

in response to an image acquisition request from a second terminal device, acquire the original image based on the storage path of the original image;

send the original image to the second terminal device; and the second terminal device configured to:

display the sample image on an interface;

determining, whether an image acquisition instruction is acquired from a user based on a number of clicks on the sample image by the user;

in response to the image acquisition instruction being acquired, send the image acquisition request for the original image to the server device; and display the original image.

11. The information processing system according to claim 10, wherein the at least one image parameter includes at least one of: an image format, a pixel size, an image resolution, and a color space; and the first terminal device is further configured to perform at least one of:

determining, based on a first preset rule that specifies a sample image format for image compression, the sample image by compressing the original image having an original image format into the sample image having the sample image format;

determining, based on a second preset rule that specifies a sample pixel size, the sample image by compressing the original image having an original pixel size into the sample image having the sample pixel size, the original pixel size being smaller than the sample pixel size;

determining, based on a third preset rule that specifies a sample image resolution, the sample image by compressing the original image having an original image resolution into the sample image having the sample image resolution, the original image resolution being higher than the sample image resolution; and determining, based on a fourth preset rule that specifies a sample color space, the sample image by compressing the original image having an original color space into the sample image having the sample color space.

12. The information processing system according to claim 10, wherein the processing first terminal device is further configured to:

determine the sample image by cropping the original image based on a fifth preset rule that specifies an area of the original image and a size of the area, the area corresponding to the sample image.

13. The information processing system according to claim 10, wherein the second terminal device is further configured to:

detect the number of clicks on the sample image by the user; and determine that the image acquisition instruction is acquired by the user in response to the number of clicks being equal to a preset number.

14. The information processing system according to claim 10, wherein the first terminal device is further configured to:

generate image information that includes the sample image and the storage path based on the sample image and the storage path, the image information indicating an association relationship between the sample image and the storage path; and send the image information to the server device.

15. The information processing system according to claim 10, wherein the storage path includes an identifier of the first terminal device and a storage location of the original image in the first terminal device.

* * * * *